United States Patent [19]

Fanning

[11] Patent Number: 5,440,600
[45] Date of Patent: Aug. 8, 1995

[54] LAMINATED ELECTROMAGNETIC PUMP STATOR CORE

[75] Inventor: Alan W. Fanning, San Jose, Calif.

[73] Assignee: General Electric Company, San Jose, Calif.

[21] Appl. No.: 6,276

[22] Filed: Jan. 15, 1993

Related U.S. Application Data

[63] Continuation-in-part of Ser. No. 818,944, Jan. 10, 1992, and a continuation-in-part of Ser. No. 836,475, Dec. 18, 1992, Pat. No. 5,195,231.

[51] Int. Cl.⁶ ............................................... G21C 1/01
[52] U.S. Cl. ..................................... 376/463; 376/361; 310/11; 310/12
[58] Field of Search ................. 376/463, 361; 310/11, 310/12, 208

[56] References Cited

U.S. PATENT DOCUMENTS

| | | |
|---|---|---|
| 1,912,167 | 5/1933 | Anderson . |
| 4,212,592 | 7/1980 | Olich et al. ............................ 417/50 |
| 4,642,882 | 2/1987 | Castiglione et al. ................ 29/596 |
| 4,859,885 | 8/1989 | Kliman et al. ........................ 310/11 |
| 4,882,514 | 11/1989 | Brynsvold et al. ................. 310/208 |
| 5,195,231 | 3/1993 | Fanning et al. ...................... 29/596 |

FOREIGN PATENT DOCUMENTS

| | | |
|---|---|---|
| 0345916 | 12/1989 | European Pat. Off. . |
| 2362524 | 3/1978 | France . |
| 1912251 | 11/1970 | Germany . |
| 2334178 | 2/1974 | Germany . |

Primary Examiner—Donald P. Walsh
Assistant Examiner—Frederick H. Voss
Attorney, Agent, or Firm—J. E. McGinness

[57] ABSTRACT

A stator core for an electromagnetic pump includes a plurality of circumferentially abutting tapered laminations extending radially outwardly from a centerline axis to collectively define a radially inner bore and a radially outer circumference. Each of the laminations includes radially inner and outer edges and has a thickness increasing from the inner edge toward the outer edge to provide a substantially continuous path adjacent the circumference.

15 Claims, 8 Drawing Sheets

LAMINATED ELECTROMAGNETIC PUMP STATOR CORE

LAMINATED ELECTROMAGNETIC PUMP STATOR CORE

The U.S. Government has rights in this invention in accordance with Contract No. DOE DE-AC03-89SF17445 awarded by the Department of Energy.

The present invention is a continuation-in-part of application Ser. No. 07/818,944, filed Jan. 10, 1992 by L. R. Dahl et al, entitled "A Method For Arranging The Power Terminals of Coils in Annular Flow Electromagnetic Pumps For Nuclear Fission Reactors," and is also a continuation-in-part of application Ser. No. 07/836,475, filed Feb. 18, 1992 by A. W. Fanning et al, entitled "Method For Producing Inner Stators For Electromagnetic Pumps, now U.S. Pat. No. 5,195,231".

CROSS REFERENCE TO RELATED APPLICATION

The present invention is related to application Ser. No. 08/003,944, filed concurrently herewith, by A. W. Fanning et al, entitled "Electromagnetic Pump Stator Coil".

This invention is concerned with an improvement in annular linear flow electromagnetic induction pumps such as the type commonly used to circulate electrically conducting liquid metal coolant through a liquid metal cooled nuclear fission reactor plant. Such coolant circulating pumps and liquid metal cooled nuclear fission reactors, and their operation or function in this service are disclosed in U.S. Pat. No. 4,508,677, issued Apr. 2, 1985, for example.

BACKGROUND OF THE INVENTION

Annular linear flow electromagnetic induction pumps for impelling liquid metals generally comprise an annular flow channel or duct which is surrounded by a column composed of a multiplicity of alternating annular stator coils and magnetic stator iron. This type of electromagnetic pump, commonly known as a single stator, annular linear flow induction pump, and its use in a liquid metal cooled nuclear fission reactor, is disclosed in U.S. Pat. No. 4,859,885, issued Aug. 22, 1989, and No. 4,882,514, issued Nov. 21, 1989.

However, a more versatile linear flow electromagnetic induction pump design than those shown in the above patents comprises a double stator system. This electromagnetic pump system comprises the single stator arrangement as shown in the aforesaid patent, which is additionally provided with a second or inner stator arrangement concentrically contained and enclosed within the pump's central linear liquid flow duct or channel. A second stator column is also composed of a multiplicity of alternating annular stator coils and stator iron. In combination, the outer and inner, or double stators act upon the liquid linearly passing through the annular flow duct.

This double stator arranged pump design provides greater pumping capacity per pump unit size, or alternatively equal capacity provided by a smaller pump unit. Accordingly the double stator pump has the advantages of greater efficiency and versatility, among others.

The disclosures and contents of U.S. Pat. No. 4,508,677, No. 4,859,885 and No. 4,882,514, are incorporated herein by reference.

SUMMARY OF THE INVENTION

A stator core for an electromagnetic pump includes a plurality of circumferentially abutting tapered laminations extending radially outwardly from a centerline axis to collectively define a radially inner bore and a radially outer circumference. Each of the laminations includes radially inner and outer edges and has a thickness increasing from the inner edge toward the outer edge to provide a substantially continuous path adjacent the circumference.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
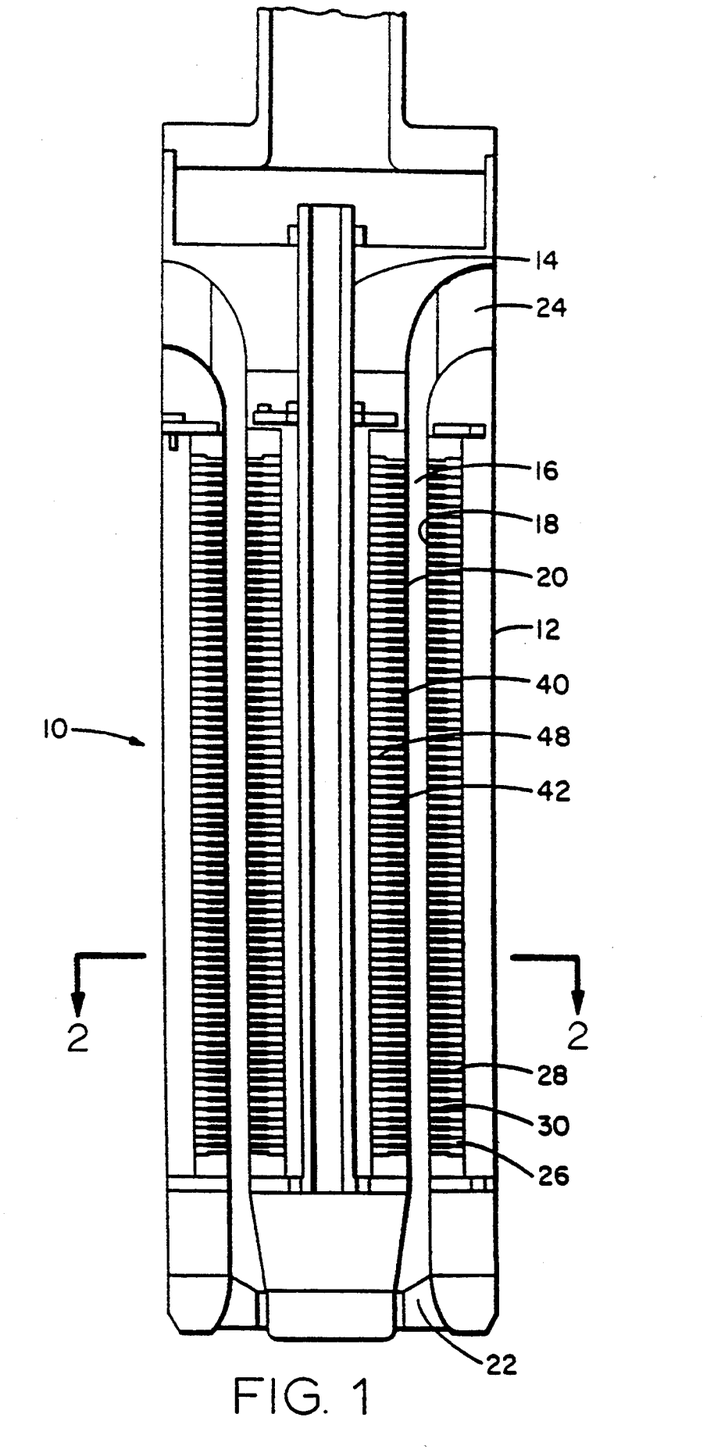
FIG. 1 is a view, part in section, of a double stator annular linear flow electromagnetic pump.
Figure 2:
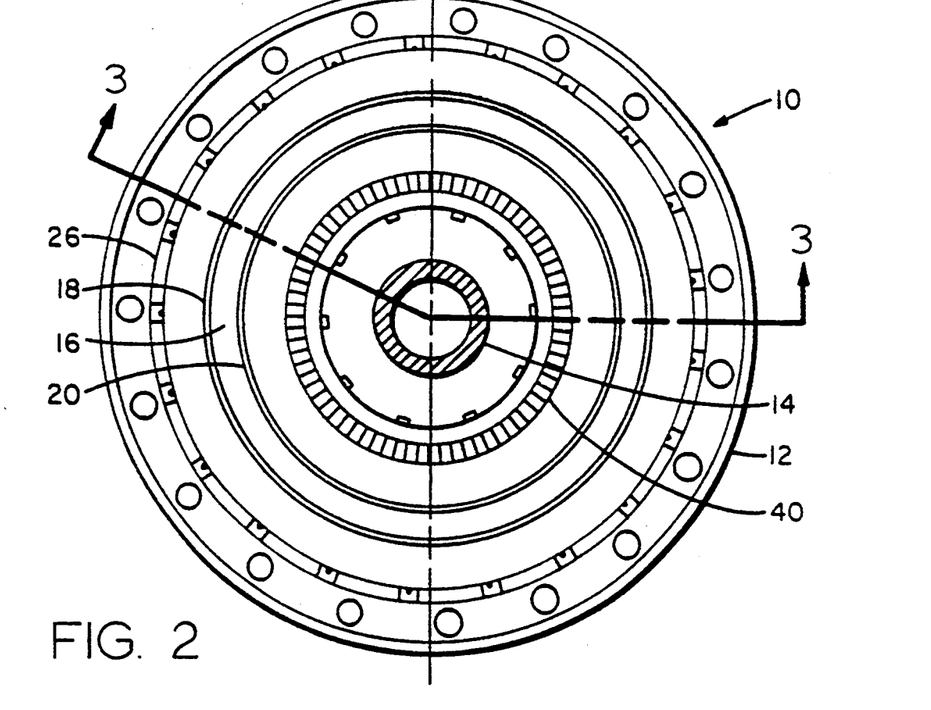
FIG. 2 is a cross-sectional view of the double stator annular linear flow electromagnetic pump of FIG. 1, taken along line 2—2.
Figure 3:
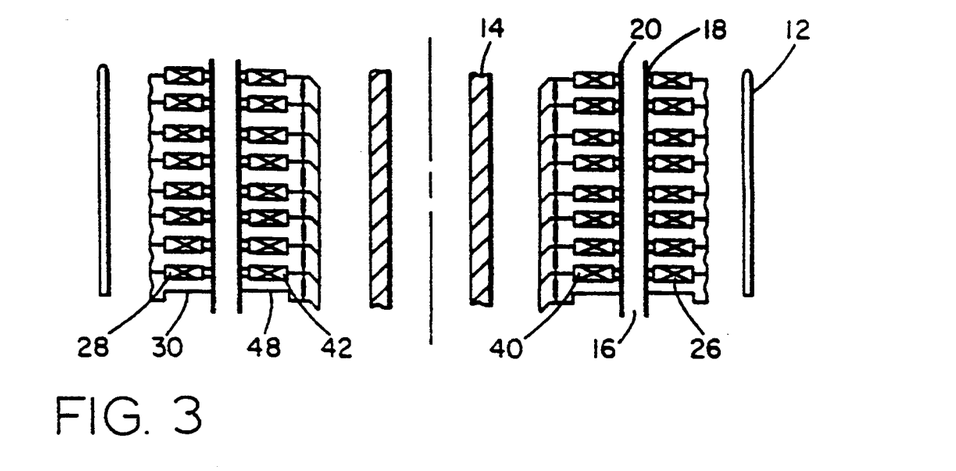
FIG. 3, is a partial cross-sectional view of the double stator assembly of the annular linear flow electromagnetic pump of FIG. 2 taken along line 3—3.

Referring to the drawings, in particular FIGS. 1, 2 and 3, a double stator annular linear flow, electromagnetic induction pump 10, for service in electrically conducting liquid systems, typically comprises the following assemblage of components: Pump housing 12, commonly a cylindrical unit, encloses the electromagnetic induction system and provides the necessary protection to enable the pump to operate submerged within the aggressive environment of liquid sodium metal commonly utilized as the coolant medium in liquid metal-cooled nuclear fission reactors. A pump assembly inner stator 40 is secured and supported by means of a central support post 14.

The double stator electromagnetic pumps 10 which are the subject of this invention contain an annular flow channel 16 for magnetically impelling the passage of liquid metal therethrough. Annular flow channel 16 is defined by an outer flow conduit 18, and a concentric smaller inner flow conduit 20. An inlet 22 provides entry to the annular flow channel 16, and outlet 24 provides for discharge therefrom, whereby the induced linear flow of liquid metal through the pump 10 is effected, generally upwardly from the bottom inlet 22 to the top outlet 24.

An outer stator 26 comprises an annular column positioned between the pump housing 12 and the outer flow conduit 18, and extends circumferentially around the outside of conduit 18. Outer stator 26 can be generally conventional in design, comprising a multiplicity of alternately stacked annular stator units having stator magnetic iron outer cores 28 and stator outer coils 30. The stator coils 30 commonly consist of electrical conductor strips or ribbons of copper metal wound into a suitably sized and coiled unit and wrapped in electrical insulation. The coil terminals or power leads extend from the outer periphery of the outer coil 30. The stator magnetic cores 28 commonly include thin iron elements or laminations which are aligned side-by-side and laminated into composite units. The iron elements can be laminated into a continuous composite ring, or laminated into a number of individual composite units or packages which in turn are assembled together into a ring configuration.

In a conventional single stator electromagnetic pump as shown in U.S. Pat. No. 4,822,514, the stator iron cores 28 and stator coils 30 are alternately stacked superimposed upon each other, forming a column surrounding the annular flow conduit 18 and providing the magnetic impelling linear flow channel. This single column of stator coils and iron cores external to the annular flow duct provides a pulsed liquid metal impelling force.

Figure 4:
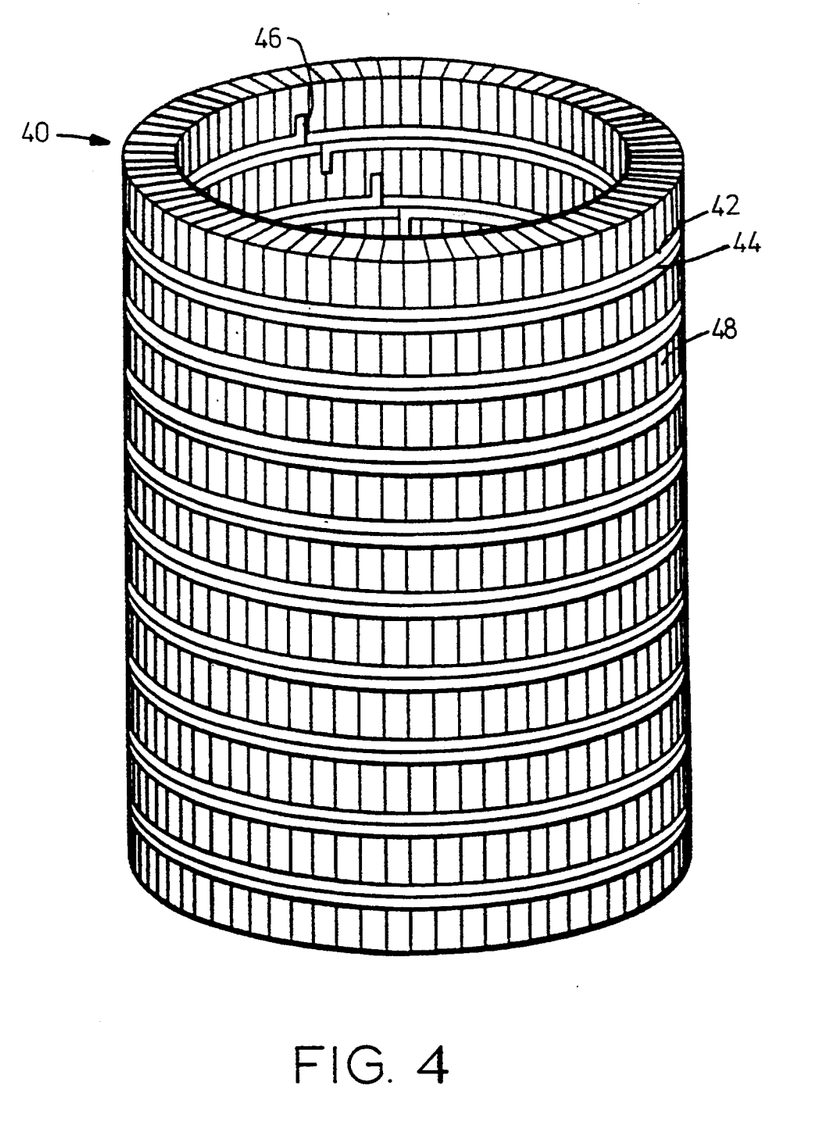
FIG. 4 is a perspective, schematic representation of an exemplary electrical stator for use in an electromagnetic pump.

With a double stator annular linear flow electromagnetic pump to which this invention primarily applies, in addition to the foregoing outer stator 26 common to the single stator pump design, the inner stator 40 comprises an annular column positioned within the inner flow conduit 20 and located circumferentially within and surrounded by conduit 20. Inner stator 40, similar to the outer stator 26, typically consists of inner coils 42 of electrical conductor strips or ribbons 44 of copper metal insulated and wound upon or within itself into suitably sized and coiled units having terminals or leads 46 extending from inside the coils 42 as shown in FIG. 4. The inner stator 40 also includes stator iron inner rings or cores 48 as shown in FIG. 1 which have thin iron elements or laminations aligned side-by-side and laminated into a continuous composite ring. Inner stator coils 42 and stator iron cores 48 are alternately stacked superimposed upon each other forming an annular column enclosed within and surrounded by the inner flow conduit 20. Coils 42 are insulated from the cores 48.

Although both the outer and inner stators 26, 40 are similarly built up or assembled from comparable components comprising alternately stacked conducting copper coils 30, 42 with insulated magnetic iron cores 28, 48 in an annular column, there remains significantly different circumstances or factors to cope with in their assembly and operation. For example, with the outer stator 26, the alignment of succeeding layers of coils 30 and cores 28 is assured by the fact that these annular components are installed around the outside of the cylindrical outer flow conduit 18. However, concerning the inner stator 40, the inner flow conduit 20 is external to the inner stator stack or column 40, and the conduit 20 is not installed around the stator unit until after it is assembled and its wiring completed in an exemplary procedure. Thus, alignment of the inner stator components is required.

Additionally, heat transfer from the outer and inner stators 26, 40 of a double stator, annular linear flow induction electromagnetic pump to the liquid metal impelled through the channel 16 is substantially dependent upon clearances existing at the stator-too flow annulus duct interface. Namely, large gaps will reduce heat transfer and result in an increase in stator temperatures whereas smaller gaps will result in the opposite effect.

For outer stators, such as 26 in FIG. 1, the gap at the stator-to-flow conduit 18 interface is minimized by the advantageous condition that typical conduit materials, such as stainless steel, have a high thermal expansion coefficient and typical stator iron materials have a lower thermal expansion coefficient. Thus, as the pump is brought up to operating temperature, thermal growth of outer flow conduit 18 exceeds that of outer stator 26, ensuring a close fit at the interface.

However, regarding the inner stator 40 of double stator induction electromagnetic pumps, the use of the same or similar component materials of construction would result in the reverse situation, that is the inner flow conduit 20 moving away from the inner stator iron core 48 as the pump 10 is brought up to operating temperature. Further complicating the occurrence is the requirement that the outer and inner flow conduits 18 and 20 be made of the same material to avoid significant differential thermal expansion between them whereby the size of the flow channel 16 through the pump would be subject to change. Therefore, there is a decided need to provide an inner stator design that minimizes the gap at the stator iron-to-flow conduit interface at pump operating temperatures.

The inner stator coils 42 have their electrical terminals or leads 46 projecting inwardly from the inner coil 42 since the inner conduit 20 prevents access to the outer circumference of the inner coil 42. Both ends of the coil 42 are used to provide the terminals 46 for connection to a power source. Moreover, the coils 42 are preferably produced by winding the strips or ribbons 44 of copper or the like metal in two or more tiers or layers either by multiple windings or combining two or more tiers, one superimposed upon the other.

Illustrated schematically in FIG. 4 is an annular stator coil unit generally representative of the outer or inner stators 26, 40, but described relative to the inner stator 40 for use in the linear flow electromagnetic induction pump 10, for service in electrically conducting liquid systems. As described above, the inner stator 40 comprises an annular stator column composed of a multiplicity of annular stator components including the stator inner coils 42 of wound copper conductors 44, having laterally emerging power terminals 46, alternately stacked or arranged with the stator iron rings of the inner cores 48. Typically the stator inner coils 42 are formed of copper strips or tapes wound upon itself, including superimposed in two tiers or layers of such windings, with the power terminals 46 emerging laterally outward from a side of the coil winding, either radially from its outside perimeter face (for the outer stator 26) or inward towards its center from the inside face (for the inner stator 40), depending upon the service location of the annular stator coil unit incorporating the coil winding. The inner stator iron core rings 48 are commonly assembled from discrete iron elements combined into a composite ring, as shown in the prior art, e.g. US Patent 4,882,514. As illustrated in FIG. 4, annular stator coils 42 and stator iron core rings 48 are alternately stacked upon each other to form a column providing the annular stator coil unit, or inner stator 40.

Figure 5:
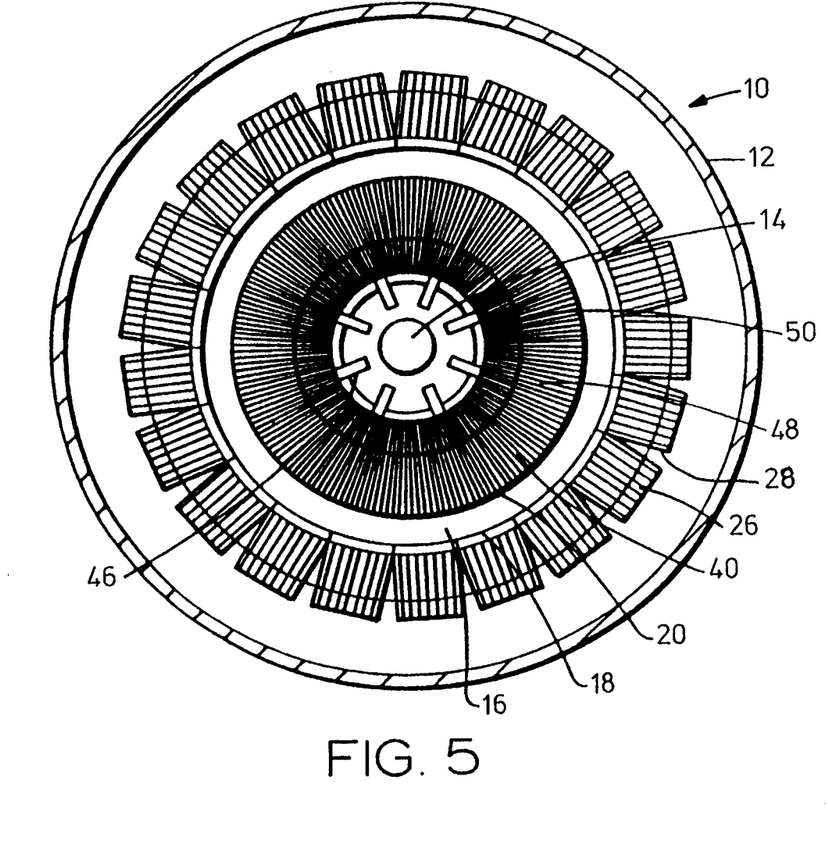
FIG. 5 is a transverse sectional view of the electromagnetic pump illustrated in FIG. 1 and taken along line A—A which is similar to FIG. 2 and discloses with more particularity inner and outer stator cores.

Annular stator cores 40 such as illustrated in FIG. 4 can be employed in electromagnetic induction pumps as shown in the prior art, and in particular in double stator electromagnetic induction pumps as shown in cross-section in FIG. 5 which illustrates additional details not shown in FIG. 2.

In a single stator unit linear flow electromagnetic induction pump, a single annular stator coil unit surrounds the outer flow conduit 18, and a simple magnetic conducting core can be included inside of the inner flow conduit 18, as shown in U.S. Pat. No. 4,859,885. With the double stator linear flow electromagnetic induction pumps, as shown in FIGS. 1 and 5, in addition to the annular outer stator 26 surrounding the outer flow conduit 18, a second annular stator coil unit, i.e. the inner stator 40, is enclosed within and surrounded by the inner flow conduit 20. This double stator coil design enhances pumping capacity or alternatively provides comparable capacity from a smaller pump. However, the annular stator coil units for either position or pump type can be similar, except for the positioning of the stator coil power terminals 46, due to opposite arrangements of the flow paired conduits 18 and 20 defining the annular flow channel 16 in combination with the stator coils. Namely the stator coil unit of a single coiled bump or the outer stator 26 of a double stator pump comprises an annular stator column which closely surrounds the outer flow conduit 18 whereby the power terminals 46 and power supplying leads must be located on the outside face of the column, and conversely, with the second, inner stator 40 of a double coil pump, the inner flow conduit 20 closely surrounds the outside surface of the second or inner annular stator 40 whereby the power terminals 46 and power supplying leads must be located on the inside face of the column.

In the exemplary embodiment illustrated in FIG. 5, the laminations of the outer core 28 abut each other circumferentially and extend in the radial direction. Since the laminations are conventionally flat sheet metal components, they may abut each other at the inner diameter of the outer core 28 and will necessarily diverge away from each other since the circumference of the outer diameter of the outer core 28 is larger than the inner diameter thereof. FIG. 5 illustrates that the laminations of the outer core 28 are arranged in groups with V-shaped voids equidistantly spaced around the circumference of the outer core 28. The outer core 28 is provided primarily to control the magnetic flux path generated by the outer coils 30 supported thereon for efficiently propelling the liquid metal through the flow channel 16. Secondarily, the outer core 28 carries heat from the outer stator by conduction to the flow channel 16 wherein it is dissipated for cooling the pump 10. Since the laminations of the outer core 28 abut each other along the outer conduit 18, they effectively carry the magnetic flux uniformly into the flow channel 16.

However, if the inner core 48 were similarly constructed, the V-shaped voids would necessarily be positioned next to the inner conduit 20 and provide interruptions in the magnetic flux generated by the inner coils 42. They would also decrease the efficiency of carrying heat from the inner stator 40 into the flow channel 16 for cooling the inner stator 40.

Figure 6:
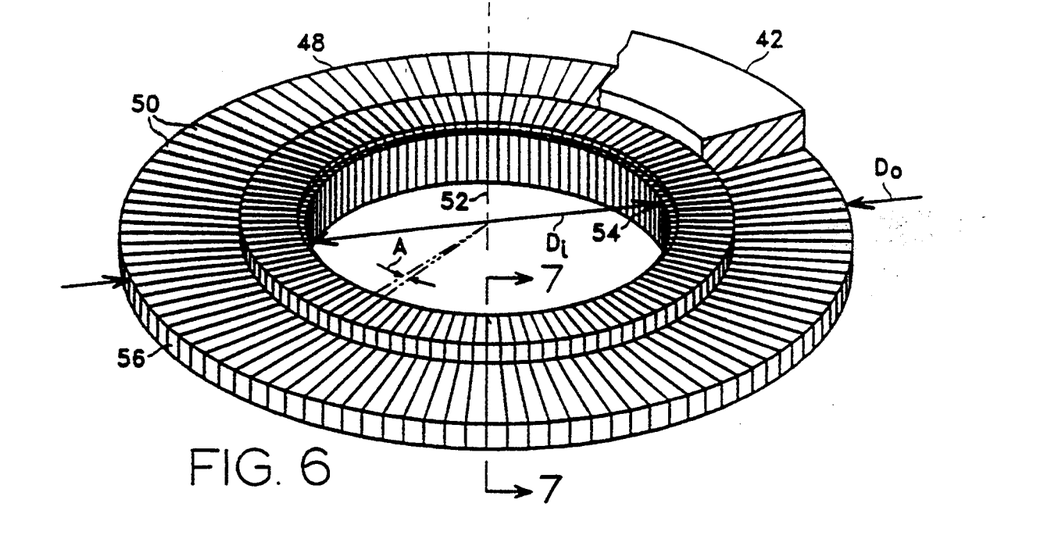
FIG. 6 is a perspective view of the inner core illustrated in FIG. 5 including a plurality of abutting tapered laminations.
Figure 7:
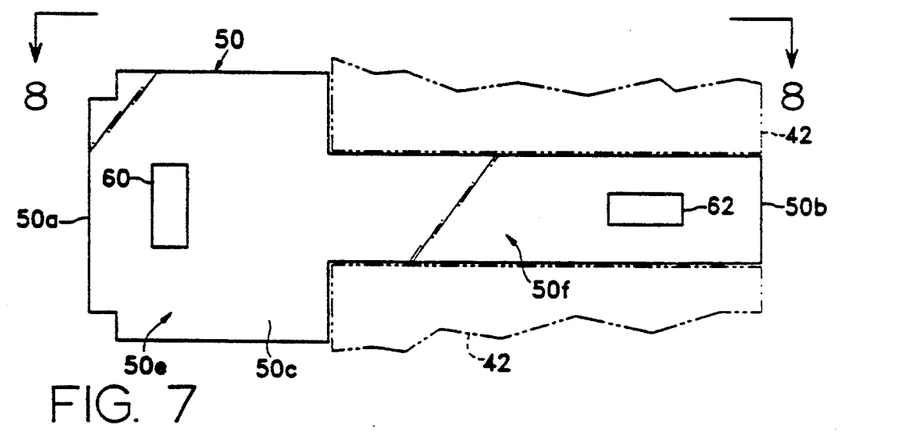
FIG. 7 is a side view of one of the laminations illustrated in FIG. 6 taken along line 7—7.
Figure 8:
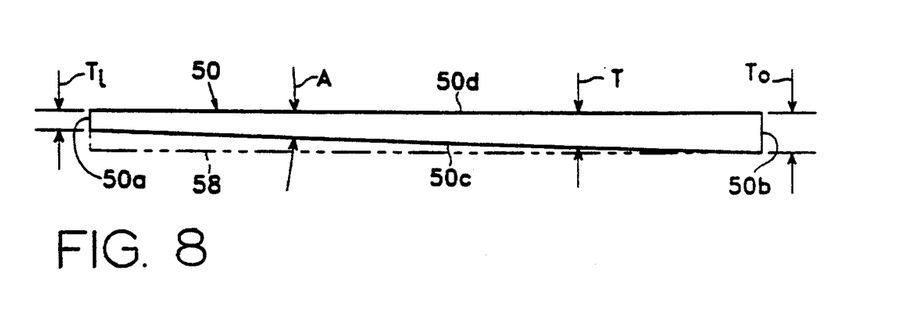
FIG. 8 is a top view of the lamination illustrated in FIG. 7 taken along line 8—8.

As shown in FIG. 5, and in more particularity in FIG. 6, the stator inner core 48 in accordance with one embodiment of the present invention preferably includes a plurality of circumferentially abutting tapered iron laminations 50 extending radially outwardly from a common centerline axis 52 to collectively define a radially inner bore 54 having a common inner diameter $D_i$, and a radially outer circumference 56 having a common outer diameter $D_o$, with the several laminations 50 being coextensive with each other and coplanar to define a substantially uniform ring. As shown in FIGS. 7 and 8, each of the laminations 50 has a radially inner edge 50a and a radially outer edge 50b, and a thickness T measured in the circumferential direction which increases from the inner edge 50a toward and preferably to the outer edge 50b as shown in FIGS. 6 and 8. The outer edge 50b is preferably thicker, i.e. $T_o$, than the inner edge 50a, i.e. $T_i$, so that adjacent ones of the laminations 50 can abut each other at their outer edges 50b to provide a substantially continuous and uninterrupted path adjacent to and preferably around the circumference 56, as well as around the bore 54 as shown in FIG. 6, to provide a uniform path for carrying the magnetic flux from the inner coils 42 into the flow channel 16.

In the preferred embodiment illustrated in FIGS. 6–8, each of the laminations 50 is substantially solid from the inner edge 50a to the outer edge 50b. The thickness T of the laminations 50 increases linearly and continuously from the inner edge 50a to adjacent, and preferably all the way to, the outer edge 50b so that the laminations 50 abut adjacent ones thereof at least in part continuously from the inner edge 50a to the outer edge 50b. As shown in FIG. 8, each lamination 50 includes first and second circumferentially opposite sides 50c, 50d, each of which is preferably flat to abut an adjacent lamination 50 completely along the respective first and second sides 50c, 50d of adjacent laminations 50 for providing a substantially continuous path circumferentially around the inner core 48.

In one embodiment, each of the laminations 50 may be formed from suitably tapered sheet metal to provide the symmetrical tapering thereof. In another embodiment of the invention as illustrated in FIG. 8, the lamination 50 may be an initially constant thickness iron plate as additionally shown in phantom line, which may be conventionally machined to remove the excess portion designated 58 to provide the tapered lamination 50. In this embodiment, the first side 50c will, therefore, have a machined surface from the inner edge 50a to the outer edge 50b to effect the taper.

As shown in FIGS. 6 and 8, the first and second sides 50c, 50d of each lamination 50 preferably have an included acute angle A therebetween having its center at the centerline axis 52 of the inner core 48 so that when the several laminations 50 are joined side by side to form the complete ring, the laminations 50 abut each other in turn completely around the inner core 48 without interruption. The laminations 50 are preferably made as thin as practical for reducing eddy current losses therein as is conventionally known, and, for example, with the thickness $T_i$ of the lamination 50 at the inner edge 50a being about 40 mils (1.0 mm), and the thickness $t_o$ at the outer edge 50b being about 70 mils (1.8 mm).

As shown in FIG. 6, the laminations 50 abut each other to provide a complete ring and may be suitably joined together by conventional adhesives, or by inner and outer bands (not shown) or by the use of tie rods described in further detail hereinbelow.

Referring again to FIG. 7, each of the laminations 50 is preferably key-shaped with a generally square back iron, or simply back 50e adjacent the inner edge 50a, and an elongate, rectangular shank or tooth 50f extending radially outwardly therefrom to the outer edge 50b. The several shanks 50f of the laminations 50 as shown in FIG. 6 circumferentially abut each other for providing a continuous ledge around the inner core 48 for supporting the inner coil 42 thereon radially against the back 50e. In this way, the magnetic flux generated by the electrical current carried through the inner coil 42 has an effective and uniform path through the shanks 50f and backs 50e of the several laminations 50 for efficiently propelling the liquid metal through the flow channel 16.

Figure 9:
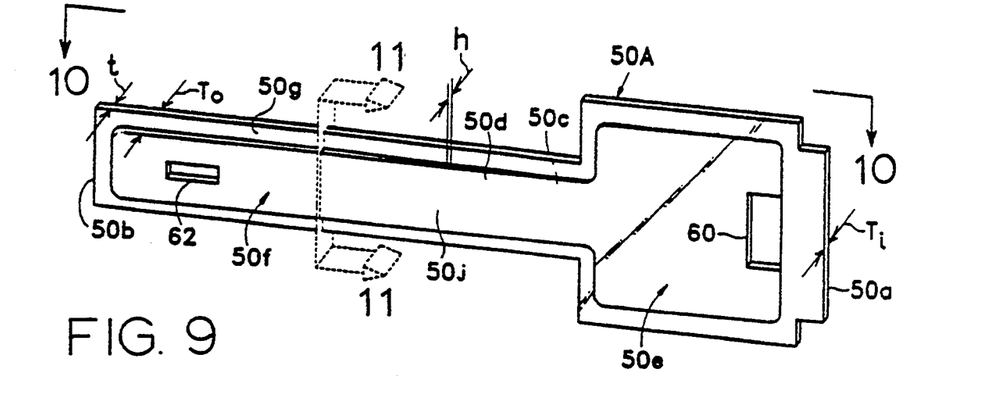
FIG. 9 is a side view of a stator core lamination in accordance with another embodiment of the present invention.
Figure 10:
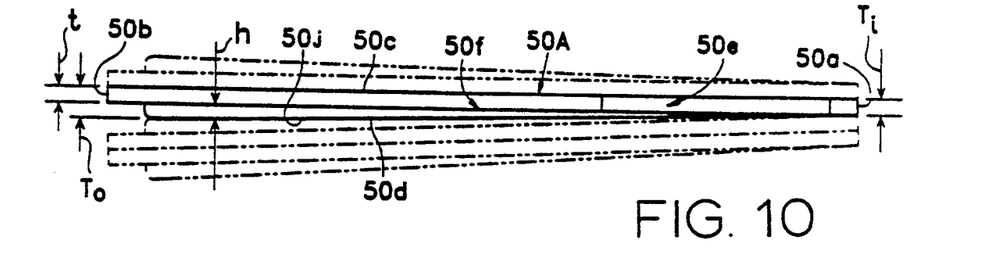
FIG. 10 is a top view of the lamination illustrated in FIG. 9 and taken along line 10—10.
Figure 11:
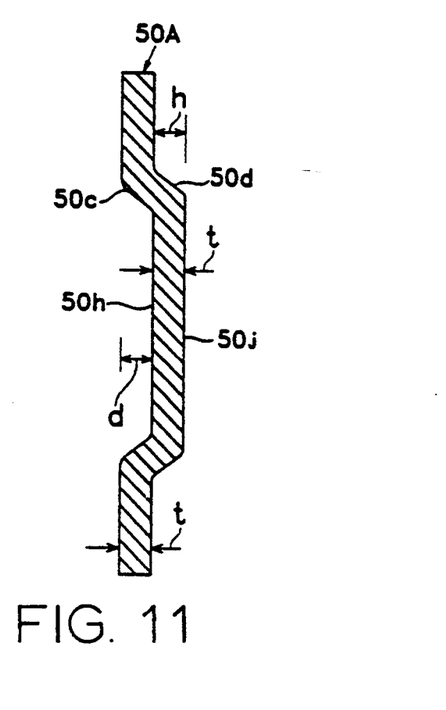
FIG. 11 is a transverse sectional view of the stator lamination illustrated in FIG. 9 and taken along line 11—11.

Illustrated in FIGS. 9–11 is another embodiment of the laminations 50, designated 50A which may be arranged to form a substantially identical inner core 48 as illustrated in FIG. 6. In this embodiment, each lamination 50A is similarly key-shaped and includes the inner edge 50a, the outer edge 50b, the first side 50c, the second side 50d, the back 50e, and the shank 50f. In this embodiment, however, each lamination 50 is initially a flat, constant thickness, i.e. thickness t, sheet metal component which is conventionally stamped or drawn to provide an increasing taper from the inner edge 50a toward the outer edge 50b. More specifically, the lamination 50 as shown in FIG. 9 has a coplanar perimeter 50g which is a narrow band extending preferably completely around the lamination 50 along both the first and second sides 50c, 50d from the inner to outer edges 50a, 50b at least along the tops and bottoms of the shank 50f and back 50e. And, preferably along also the inner edge 50a of the back 50e and along the outer edge 50b of the shank 50f. The perimeter 50g therefore completely surrounds the lamination 50A, which further includes a tapered central depression or recess 50h in the first side 50c extending in increasing depth d (see FIG. 11) from the back 50e along the shank 50f and within the perimeter 50g. The opposite side of the depression 50h defines a tapered central elevation or plateau 50j on the second side 50d which is complementary to the depression 50h on the first side 50c, which extends in increasing height h (see FIGS. 9–11 ) from the back 50e along the shank 50f and within the perimeter 50g.

The tapered depression 50h may be conventionally formed by plastically deforming the central region of the initially flat lamination 50 which simultaneously forms the central elevation 50j on the second side 50d. The perimeter 50g preferably extends completely around the lamination 50 on the top and bottom sides of the back 50e and shank 50f and along both the inner and outer edges 50a and 50b to provide a band which is suitably clamped in the stamping machine to allow the central depression 50h to be formed.

As shown in FIG. 10, adjacent ones of the laminations 50 (shown additionally in phantom) are preferably disposed in back-to-back pairs with each pair being in abutting contact completely along the respective perimeters 50g thereof, and next adjacent laminations being in abutting contact completely along the elevations 50j thereof. Although each lamination 50 is formed of a constant thickness sheet metal stamping, the central depression 50h and elevation 50j provide a linearly increasing projected thickness from the small thickness $T_i$ at the inner edge 50a to the larger thickness $t_o$ adjacent the outer edge 50b. As shown in FIG. 10, the stamped lamination 50A is configured to abut adjacent laminations 50A from the inner edge 50a almost completely to the outer edge 50b along the full radial extent of the central elevation 50j. The resulting relatively small end-gaps between the adjacent lamination pairs at the outer edge 50b may be configured to be as small as practical or may be eliminated by machining away the outer edges 50b until they meet the end of the central elevation 50j if desired.

Although the laminations 50A are not solid like the laminations 50 illustrated in FIGS. 7 and 8, they nevertheless abut adjacent ones thereof at least in part continuously from the inner edge 50a to adjacent the outer edge 50b along either the perimeters 50g thereof or the adjacent central elevations 50j. The adjacent central depressions 50h necessarily provide a void therebetween, and another void is also provided between the adjacent perimeters 50g where adjacent elevations 50j abut each other. Nevertheless, the laminations 50a are uniformly configured circumferentially around the inner core 48 to provide for the uniform channeling of magnetic flux therethrough with small eddy current losses due to the use of thin sheet metal. The abutting laminations 50A also provide an effective heat conducting path to the outer edges 50b and in turn to the flow channel 16.

Figure 12A:
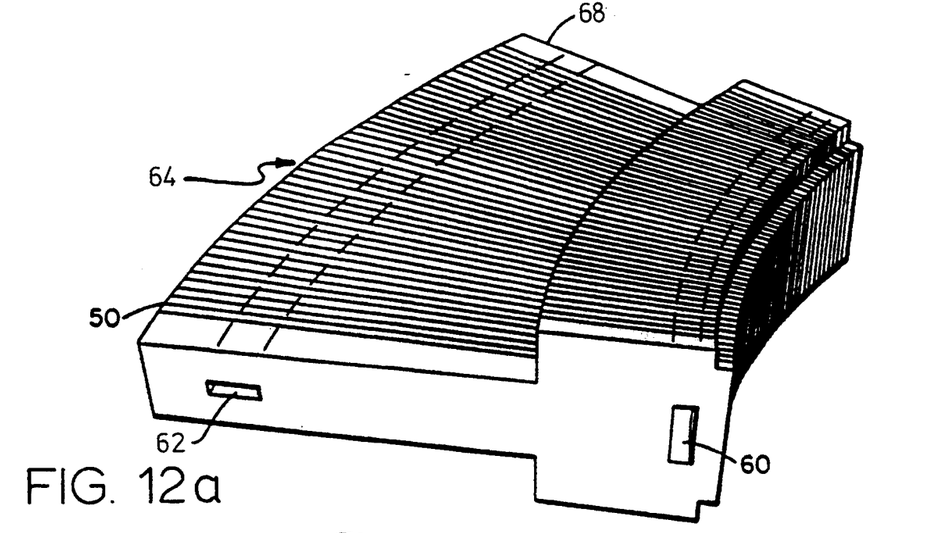
FIG. 12a-12g are a perspective view of a sector including a plurality of laminations joined together between two end plates using the various tie rods illustrated in FIGS. 9b through 9g.

As illustrated for example in FIGS. 7 and 9, each of the laminations 50, 50A preferably has radially inner and outer holes 60, 62 adjacent to the respective inner and outer edges 50a, 50b thereof, and the laminations, e.g. 50, are preferably assembled in groups or sectors 64 as shown in FIG. 12a. A pair of tie rods 66 as shown generally in FIGS. 12b–g extend through respective ones of the inner and outer holes through the sector 64 to fixedly join together the laminations 50 in each of the sectors 64. As shown in FIG. 12a, each sector 64 may have two end plates 68 which may be substantially identical in configuration to the interposed laminations 50, but thicker for allowing the tie rods 66 to sandwich together the laminations 50 in each sector 64.

Suitable forms of the tie rods 66 or mechanical fasteners to clamp together the individual sectors 64 are shown in FIGS. 12b through 12g for extending through the respective holes 60 and 62 passing through each element at a common location. The inner holes 60 as illustrated in FIGS. 7, 9, and 12a are preferably elongate slots oriented with their narrowest dimension being perpendicular to the magnetic flux path. More specifically, the inner holes 60 have their longer dimension extending parallel to the centerline axis 52 (see FIG. 6) of the completed inner core 48, with the narrower dimension being disposed radially or perpendicular to the centerline axis 52. However, the outer holes 62 have their longer dimension extending radially or perpendicular to the centerline axis 52, with their narrower dimension extending parallel to the centerline axis 52. In this way, the tie rods 66 will have minimal adverse effect on the magnetic flux path through the inner core 48.

Figures 12B, 12C:
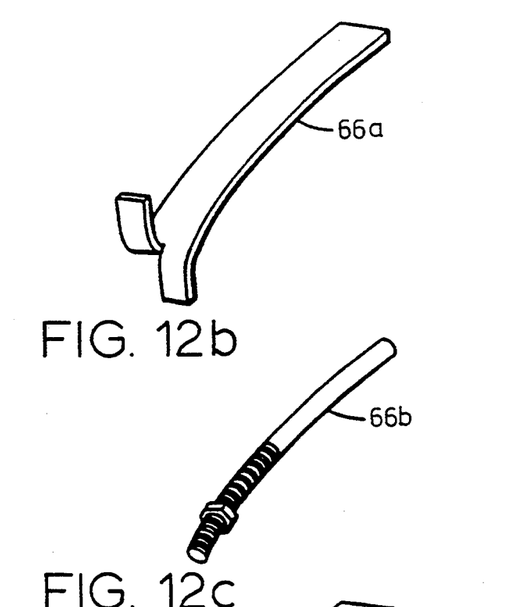
Figure 12D:
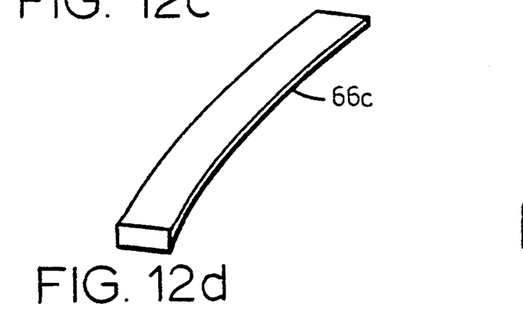
Figure 12E:
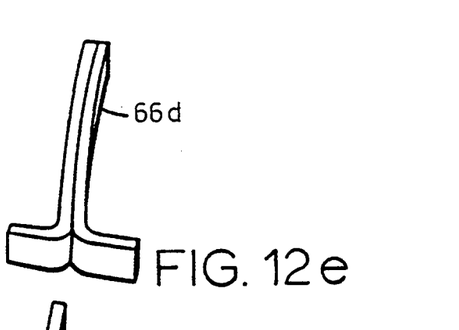
Figures 12F, 12G:
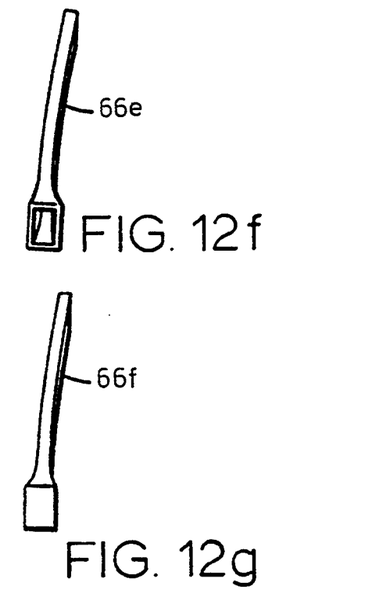

The tie rods 66 may take any suitable form including a first embodiment of the tie rod 66, designated 66a and shown in FIG. 12b, having a rectangular cross section and split and bent aft ends to fasten the first tie rod 66a in the sector 64. FIG. 12c illustrates a second tie rod 66b which is a circular bar threaded at both ends and using nuts to fasten each sector 64 together. FIG. 12d illustrates a third rectangular tie rod 66c wherein its opposite ends may be welded flush to the end plates 68. FIG. 12e illustrates a fourth tie rod 66d formed in two coextensive rectangular parts wherein the opposite ends thereof are separately bent for fastening the tie rod 66d in the sector 64. FIG. 12f illustrates a tubular, rectangular fifth tie rod 66e having opposite ends mushroomed, or plastically deformed, for fastening the tie rod 66e in the sector 64. And, FIG. 12g illustrates a solid, rectangular sixth tie rod 66f having opposite ends which again are mushroomed or plastically deformed to fasten the tie rod 66f in the sector 64.

The various embodiments of the tie rods 66 may be used as desired in either the inner or outer holes through the sectors 64 where mechanical fastening is desired to rigidly clamp together the lamination groups. In alternate embodiments, the inner and outer holes 60, 62 may be eliminated, and the laminations 50 may be suitably and conventionally bonded together using an adhesive.

Figure 13:
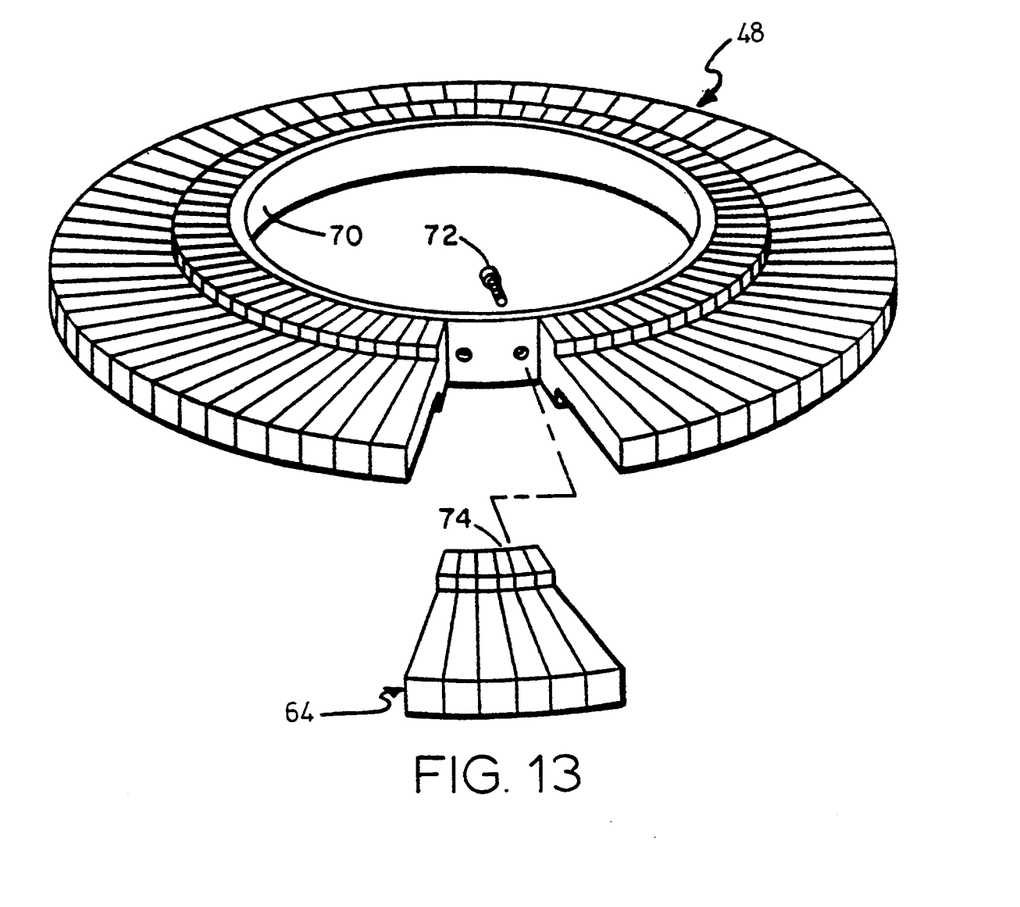
FIG. 13 is a perspective, partially exploded view of the inner core illustrated in FIG. 6 in accordance with another embodiment of the present invention.

To mitigate against possible damage due to vibrations, it is highly desirable to clamp the stator sectors 64 together in a continuous ring to form the inner core 48. For the inner stators 40, this function can be provided by pulling the iron of each lamination unit up against the outside diameter of an alignment ring 70 as shown in FIG. 13. This may be accomplished with radially oriented bolts 72 extending from the inside diameter of the alignment ring 70 into tapped holes 74 in the package of iron elements or sectors 64. The alignment ring 70 thus becomes an integral part of the inner stator lamination core 48 assembly.

Accordingly, the alignment ring 70 is disposed coaxially in the bore 54, with the bolts 72 extending radially outwardly through the ring 70 and threaded into the sectors 64 for fixedly joining the sectors 64 to the ring 70. The last sector 64 as shown in FIG. 13 is an arcuate section and may be sized with preferred manufacturing tolerances so that as the bolts 72 draw the sector 64 radially inwardly, the last sector 64 is wedged between the adjacent sectors to provide a clamping force around the circumference of the inner core 48.

To maximize the thermal expansion of the inner stator 40, the alignment ring 70 is made of a high thermal expansion alloy, such as 304 or 316 stainless steel. Thus, the expansion rate of the inner core 48 is a composite of the expansion rates of the alignment ring 70 and laminations 50. In combination with higher operating temperatures, the composite expansion rate is sufficient to assure that the inner stator core 48 will experience thermal growth comparable to that of the inner flow conduit 20. Thus, the inner core-to-flow conduit gap and inner stator temperatures are minimized. Furthermore, with the use of a shrink fit at assembly, the inner flow conduit 20 will function as a significant band clamp for the complete inner stator 40.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the U.S. is the invention as defined and differentiated in the following claims:

1. A stator core comprising a plurality of elements laminated together in a circumferential array, each of said elements being arranged between a pair of adjacent elements and having first and second planar radial surfaces which lie in respective radial planes intersecting a centerline axis of said stator core, said first planar radial surface of each one of said elements being in contact and opposing said first planar radial surface of an adjacent one of said elements, and said second planar radial surface of each one of said elements being in contact and opposing said second planar radial surface of an adjacent one of said elements, said first and second planar radial surfaces being disposed at an acute angle relative to each other, each of said elements having a key-shaped profile with a generally square back and an elongated shank, said square back being radially inward of said elongated shank, each of said elements further comprising:
   a coplanar perimeter extending around said element along first and second sides from an inner edge to an outer edge along the tops and bottoms of said shank and said back, said first side of said perimeter forming said first planar radial surface;
   a tapered central recess in said first side extending in increasing depth from said back along said shank and within said perimeter; and
   a tapered central elevation on said second side being complementary to said recess on said first side and extending in increasing height from said back along said shank and within said perimeter, said elevation forming said second planar radial surface.

2. A core according to claim 6 wherein:
   said perimeter extends completely around said element along both said inner and outer edges; and
   adjacent ones of said elements are disposed in back-to-back pairs with each pair being in abutting contact completely around said perimeter thereof, and next adjacent elements being in abutting contact completely along said elevations thereof.

3. A core according to claim 2 wherein each of said elements is a sheet metal component having a depression, said depression forming said central recess on said first side and said central elevation on said second side.

4. A stator core comprising a plurality of elements laminated together in a circumferential array, each of said elements being sandwiched between a pair of adjacent elements and having first and second planar radial surfaces which lie in respective radial planes intersecting a centerline axis of said stator core, said first planar radial surface of each one of said elements being in contact and opposing said second planar radial surface of an adjacent one of said elements, said first and second planar radial surfaces being disposed at an acute angle relative to each other, each of said elements being a solid wedge with no gaps in the volume between said first and second planar radial surfaces.

5. The stator core as defined in claim 4, wherein each of said elements has a radially inner edge and a radially outer edge, said radially inner edges forming an radially inner bore of said stator core and said radially outer edges forming a radially outer circumference of said stator core.

6. The stator core as defined in claim 4, wherein each of said elements has a key-shaped profile with a generally square back and an elongated shank, said square back being radially inward of said elongated shank.

7. The stator core as defined in claim 4, wherein each of said elements is a plate having a tapered thickness, said thickness increasing linearly in a radial direction.

8. The stator core as defined in claim 7, wherein each of said plates is made of iron.

9. The stator core as defined in claim 4, wherein each of said elements is a plate of constant thickness with a depression formed therein, said first planar radial surface comprising a planar surface on the perimeter of a recess formed on one side of said respective element by said depression and said second planar radial surface comprising a planar surface on a projection formed on the other side of said respective element by said depression.

10. A linear flow electromagnetic induction pump comprising an inner stator and an outer stator for impelling liquid metal through an annular flow channel therebetween, each of said inner and outer stators comprising a multiplicity of alternately stacked stator cores and stator coils, wherein each stator core of said inner stator comprises a plurality of elements laminated together in a circumferential array, each of said elements being sandwiched between a pair of adjacent elements and having first and second planar radial surfaces which lie in respective radial planes intersecting a centerline axis of said stator core, said first planar radial surface of each one of said elements being in contact and opposing said second planar radial surface of an adjacent one of said elements, said first and second planar radial surfaces being disposed at an acute angle relative to each other.

11. The linear flow electromagnetic induction pump as defined in claim 10, wherein each of said elements has a radially inner edge and a radially outer edge, said radially inner edges forming an radially inner bore of said stator core and said radially outer edges forming a radially outer circumference of said stator core.

12. The linear flow electromagnetic induction pump as defined in claim 10, wherein each of said elements has a key-shaped profile with a generally square back and an elongated shank, said square back being radially inward of said elongated shank.

13. The linear flow electromagnetic induction pump as defined in claim 10, wherein each of said elements is a plate having a tapered thickness, said thickness increasing linearly in a radial direction.

14. The linear flow electromagnetic induction pump as defined in claim 13, wherein each of said plates is made of iron.

15. The linear flow electromagnetic induction pump as defined in claim 9, wherein each of said elements is a plate of constant thickness with a depression formed therein, said first planar radial surface comprising a planar surface on the perimeter of a recess formed on one side of said respective element by said depression and said second planar radial surface comprising a planar surface on a projection formed on the other side of said respective element by said depression.

* * * * *